United States Patent
Ohmi et al.

[11] Patent Number: 6,158,679
[45] Date of Patent: Dec. 12, 2000

[54] ORIFICE FOR PRESSURE TYPE FLOW RATE CONTROL UNIT AND PROCESS FOR MANUFACTURING ORIFICE

[75] Inventors: Tadahiro Ohmi, 1-17-301, Komegahukuro 2-Chome, Aoba-ku, Sendai-shi, Miyagi 980-0813; Tetu Kagazume; Kazuhiko Sugiyama, both of Yamanashi; Osamu Fukada, Osaka; Susumu Ozawa, Osaka; Yoshihiro Satou, Osaka; Ryousuke Dohi, Osaka; Tomio Uno, Osaka; Kouji Nishino, Osaka; Hiroyuki Fukuda, Osaka; Nobukazu Ikeda, Osaka; Michio Yamaji, Osaka, all of Japan

[73] Assignees: Fujikin Incorporated, Osaka; Tokyo Electron Ltd., Tokyo; Tadahiro Ohmi, Miyagi, all of Japan

[21] Appl. No.: 09/284,372

[22] PCT Filed: Aug. 13, 1998

[86] PCT No.: PCT/JP98/03621

§ 371 Date: Jun. 16, 1999

§ 102(e) Date: Jun. 16, 1999

[87] PCT Pub. No.: WO99/09324

PCT Pub. Date: Feb. 25, 1999

[30] Foreign Application Priority Data

Aug. 15, 1997 [JP] Japan ................... 9-220368

[51] Int. Cl.[7] .................................................. A62C 31/02
[52] U.S. Cl. .......................................................... 239/589
[58] Field of Search ................... 239/589, 591, 239/585.1–585.5, 533.12

[56] References Cited

U.S. PATENT DOCUMENTS

| | | | |
|---|---|---|---|
| 2,175,160 | 10/1939 | Zobel et al. ........................... | 239/589 |
| 4,391,339 | 7/1983 | Johnson, Jr. et al. ................. | 239/589 |
| 4,531,679 | 7/1985 | Pagdin ................................. | 239/585.1 |
| 4,793,556 | 12/1988 | Sharp ................................... | 239/589 |
| 4,830,280 | 5/1989 | Yankoff ............................... | 239/591 |
| 5,062,573 | 11/1991 | Makimura ........................... | 239/533.12 |
| 5,597,122 | 1/1997 | Eisenmann ......................... | 239/589 |

FOREIGN PATENT DOCUMENTS

| | | |
|---|---|---|
| 9102532 | 6/1984 | Japan . |
| 62-56168 | 4/1987 | Japan . |
| 567345 | 9/1993 | Japan . |
| 577100 | 10/1993 | Japan . |
| 6159199 | 6/1994 | Japan . |
| 8338546 | 12/1996 | Japan . |
| 9108596 | 4/1997 | Japan . |

*Primary Examiner*—Andres Kashnikow
*Assistant Examiner*—Dinh Q. Nguyen
*Attorney, Agent, or Firm*—Griffin & Szipl, P.C.

[57] ABSTRACT

An orifice for a pressure-type flow rate controller, which can be produced by a simple method at a low cost, that provides a linearity—between the pressure P1 on the upstream side of the orifice and the flow rate—over a wide range of the pressure ratio P2/P1 of the pressure P2 on the downstream side of the orifice to the upstream pressure P1 and that permits adjustment with ease of flow characteristics among a plurality of orifices. The orifice comprises an inlet taper 1 in the shape of a bugle and a short narrowed straight section 2 adjoining the inlet taper 1, both formed by cutting one opening end of a preliminary hole 6 made in an orifice plate D, and further comprises a short inner taper 3 and an enlarged straight section 4 connecting with the taper 3 which are formed by enlarging the preliminary hole 6 at the other opening end, the short inner taper 3 adjoining the narrowed straight section 2 on one side and neighboring the enlarged straight section 4 on the other side.

4 Claims, 16 Drawing Sheets

ORIFICE FOR PRESSURE TYPE FLOW RATE CONTROL UNIT AND PROCESS FOR MANUFACTURING ORIFICE

FIELD OF THE INVENTION

The present invention relates to an improvement of a sonic velocity nozzle orifice for pressure-type liquid flow rate controllers and a method of making the same, the flow controllers being mainly used in gas supply systems in semiconductor manufacturing facilities.

BACKGROUND OF THE INVENTION

Mass flow controllers have been widely used as flow rate controllers in gas supply systems in semiconductor manufacturing facilities. In recent years, pressure-type flow controllers have been developed to replace the mass flow controllers.

FIG. 20 shows the configuration of the pressure-type flow controller, which the inventors developed earlier and disclosed in unexamined Japanese patent publication No. 08-338546. The controller is based on the principle of calculating the fluid flow rate Q on the downstream side of an orifice 5 with the equation Q=KP1 (K=a constant) with the ratio P2/P1 of pressure P2 on the downstream side of the orifice 5 to the upstream pressure P1 kept below the ratio of the gas critical pressure.

Referring to FIG. 20, reference numeral 1 indicates a pressure-type flow rate controller; 2, a control valve; 3, a valve drive; 4, a pressure detector; 5, an orifice; 7, a control unit; 7a, a temperature correction circuit; 7b, a flow rate calculation circuit; 7c, a comparison circuit; 7d, an amplification circuit; 21a and 21b, amplification circuits; 22a and 22b, analog to digital (A/D) conversion circuits; 24, an inversion amplifier; 25, a valve; Qy, a control signal; Qc, a calculation signal; and Os, a set flow rate signal.

The pressure type flow rate controller illustrated in FIG. 20 permits control with high precision of the flow Q on the downstream side of the orifice by regulating the pressure P1 on the upstream side through actuation of control valve 2. The flow rate controller has proved to be very useful in practice.

However, this pressure type flow control system still has many problems yet to be solved. Foremost among them are those concerned with the sonic velocity nozzle (orifice).

The first problem is the cost for manufacturing the orifice. The flow control system sometimes requires orifices with a bore diameter of 10 μm to 0.8 mm Ø. Sonic velocity orifices with bore diameters in the range 10 μm to 0.8 mm Ø are usually machined by electric discharge or etching. Machining the orifice by electric discharge or etching to a specific configuration, for example, the configuration specified in ISO 9300 boosts the manufacturing costs too much.

The second problem is uniformity in orifice flow characteristics. Sonic orifices with a fine bore are difficult to machine uniformly, such that it is difficult for the flow rate characteristics of different orifices to uniformly fall in a specific range and the flow rate characteristics tend to vary widely from orifice to orifice. The result is low accuracy in measurement of the flow rate, and correction of measurement takes too much time and trouble.

The third problem is a range of linearity of the flow rate characteristics curve. If the ratio P2/P1 of the downstream pressure P2 to the upstream pressure P1 drops below a critical pressure ratio of gas (in the case of air and nitrogen, some 0.5), the flow velocity of the gas passing through the orifice will reach sonic velocity. Then the pressure change on the downstream side of the orifice will no longer propagate to the upstream side. As a result, it is believed that it is possible to obtain a stable mass flow rate corresponding to the state upstream of the orifice.

The problem is that, according to the actual flow rate characteristic curve, the pressure ratio range where the so-called linearity characteristics are applicable, that is, where the flow rate calculation can be made with the equation Q=KP1, is far below the critical gas pressure ratio point. That is, the range where the flow rate is controllable is correspondingly limited and narrowed.

Further, because there exist problems with the linearity characteristic itself, a high degree of linearity is difficult to obtain, and any further improvement in flow control precision cannot be expected from the prior art.

SUMMARY OF THE INVENTION

The present invention addresses problems encountered with prior art orifices for pressure-type flow rate controllers, including: (a) high manufacturing costs, (b) difficulties in the machining of orifices and difficulties in obtaining stable flow rate control with high precision due to differences between orifices in controlled flow rate resulting from non-uniformity in machining precision, (c) the pressure ratio range in which linearity in orifice flow rate characteristics is observed is narrow, resulting in lack of high precision flow rate control at a wide range of pressure ratios, and (d) the linearity characteristics are not high in degree, making it difficult to further improve controlling precision. It is an object of the present invention to provide orifices for pressure-type flow rate controllers that are relatively easy to machine at a substantially reduced cost, have relatively low non-uniformity in flow characteristics, and permit high precision pressure-flow control in a wide pressure ratio range. It is another object of the present invention to provide a method of making the same.

To solve those problems, the present invention as claimed in claim 1 provides an orifice for pressure-type flow rate controllers wherein the fluid flow rate Q on the downstream side of the orifice is calculated with the equation Q=KP1 (K=a constant, P1=pressure on the upstream side of the orifice) with the ratio P2/P1 of pressure P2 on the downstream side of the orifice to the upstream pressure P1 kept below the gas critical pressure ratio and wherein the control valve on the upstream side of the orifice is so actuated according to a signal indicating the difference between the calculated flow rate Q and the set flow rate Qs as to regulate the upstream pressure P1 so that the downstream flow rate is regulated to the set flow rate Qs, the orifice comprising an inlet taper 1 in the shape of a bugle and a short narrowed straight section 2 adjoining the inlet taper 1, both formed by cutting one opening end of a preliminary hole 6 made in the orifice plate D, and a short inner taper 3 and an enlarged straight section 4 connecting with the taper 3 which are formed by enlarging the preliminary hole 6 at the other opening end, the short inner taper 3 adjoining the narrow straight section 2 on one side and neighboring the enlarged straight section 4 on the other side.

The present invention as claimed in claim 2 provides an orifice for pressure-type flow rate controllers defined in claim 1, wherein the inlet taper 1 is formed with a bell-shaped cutting tool such that the inside wall surface of the inlet taper 1 is curved as seen in a sectional view.

The present invention as claimed in claim 3 provides an orifice for pressure-type flow rate controllers defined in claim 1, wherein the inlet taper 1 is formed with a so-called straight cutting tool such that the inside wall surface of the inlet taper 1 is straight as seen in a sectional view.

The present invention provides a method of making orifices for pressure-type flow rate controllers which comprises drilling a preliminary hole 6 from one side face to the other face of an orifice plate D, thereafter forming an inlet taper 1 in the shape of a bugle and a short narrowed straight section 2 adjoining the inlet taper 1 by cutting the inside of the inlet in one side face of the preliminary hole 6 using a cutting tool 1a, and then enlarging the preliminary hole 6 by drilling from the other side face of the orifice plate D using an enlarging drill 4a, thus forming a short inner taper 3 adjoining the narrowed straight section 2 and an enlarged straight section 4 adjoining the short inner taper 3.

The present invention provides a method of making an orifice for an orifice for a pressure-type flow rate controller, wherein the cutting tool to form the inlet taper 1 is a bell-shaped cutting tool or a straight cutting tool.

The present invention provides a method of making an orifice for a pressure-type flow rate controller defined in claim 4 or claim 5, which comprises: after forming the inlet taper 1 and the narrowed straight section 2 adjoining the taper 1, enlarging the preliminary hole 6 by drilling from one side face of the orifice plate D using a drill 2a with an outside diameter equal to the inside diameter Ø of the narrowed straight section 2, before enlarging the preliminary hole 6 from the other side face using the enlarging drill 4a, deburring the other face side end of the enlarged preliminary hole 6 using a center drill larger in diameter than the enlarging drill 4a and, after forming the inner taper 3, deburring from the other face side the other face side end of the narrowed straight section 2 using the drill 2a with an outside diameter equal to the inside diameter Ø of the narrowed straight section 2.

LIST OF REFERENCE NUMERALS AND LETTERS

Figure 1:
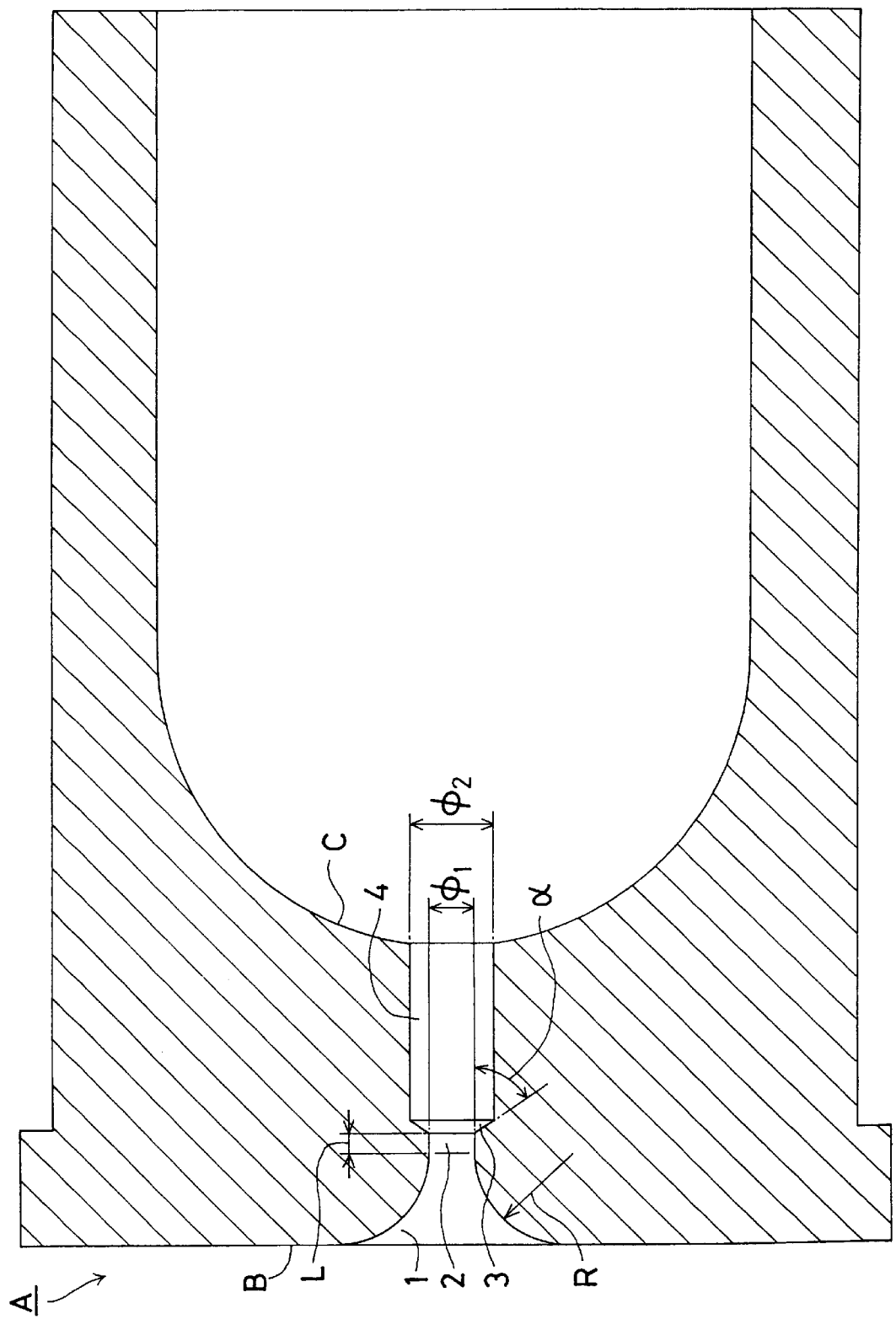
FIG. 1 is a vertical, sectional view of an orifice for a pressure-type flow rate controller according to the present invention.

A Orifice
$Ø_1$ Inside diameter of the narrowed straight section
$Ø_2$ Inside diameter of the enlarged straight section
D Orifice plate
B Outer surface on the fluid inlet side
C Outer surface on the fluid outlet side
1 Inlet taper
1a Bell-shaped cutting tool
2 Narrowed straight section
2a Drill of 0.11 mm in diameter
3 Inner taper
4 Enlarged straight section
4a Enlarging drill of 0.2 mm in diameter
5 Center depression
5a Punch for center tapping
6 Preliminary hole
6a Drill of 0.1 mm in diameter
7 Center drill
R Radius of curvature of inlet taper
L1 Depth of cone-shaped inlet taper
L Length of narrowed straight section
$α_0$ Inclination angle of cone-shaped inlet taper
α Inclination angle of inner taper
L2 Length of inner taper and enlarged straight section

DESCRIPTION OF THE PREFERRED EMBODIMENTS

There will now be described the embodiments of the present invention with the reference to the drawings.

Referring to FIG. 1, there is shown a vertical, sectional view of an orifice for a pressure-type flow rate controller according to the present invention. In FIG. 1, the reference letter A indicates the orifice, while the reference numeral 1 indicates an inlet taper; 2, a narrowed straight section; 3, an inner taper; and 4, an enlarged straight section.

The orifice A is formed by cutting a stainless steel plate of about 2 to 3 mm in thickness under the JIS designation SUS 316L, with the outer surface B on the inlet side (high pressure side of fluid) being plain, the outer surface C on the outlet side (low pressure side of fluid) being concave (hemispherical in the innermost portion), and the inside diameter $Ø_1$ of the orifice being 0.11 mm.

The inlet taper 1 is formed in the shape of the flared bell form of a bugle with a curvature radius of 0.22 mm. Next to this inlet taper 1 is formed the narrowed straight section 2 with a length of 0.05 mm.

The inside diameter of the narrowed straight section 2 measures 0.11 mm. This narrowed straight section 2 determines the inside diameter of the orifice A.

The inner taper 3 is formed adjacent the narrowed straight section 2. In the orifice A shown in FIG. 1, the inner taper 3 has an inclination angle α of some 60 degrees determined by the tip shape (a point angle of 120 degrees) of the drill with an outside diameter of 0.2 mm, which will be described in detail later.

Then, the enlarged straight section 4 is formed adjacent the inner taper 3 and measures 0.2 mm Ø in inside diameter.

Figure 2:
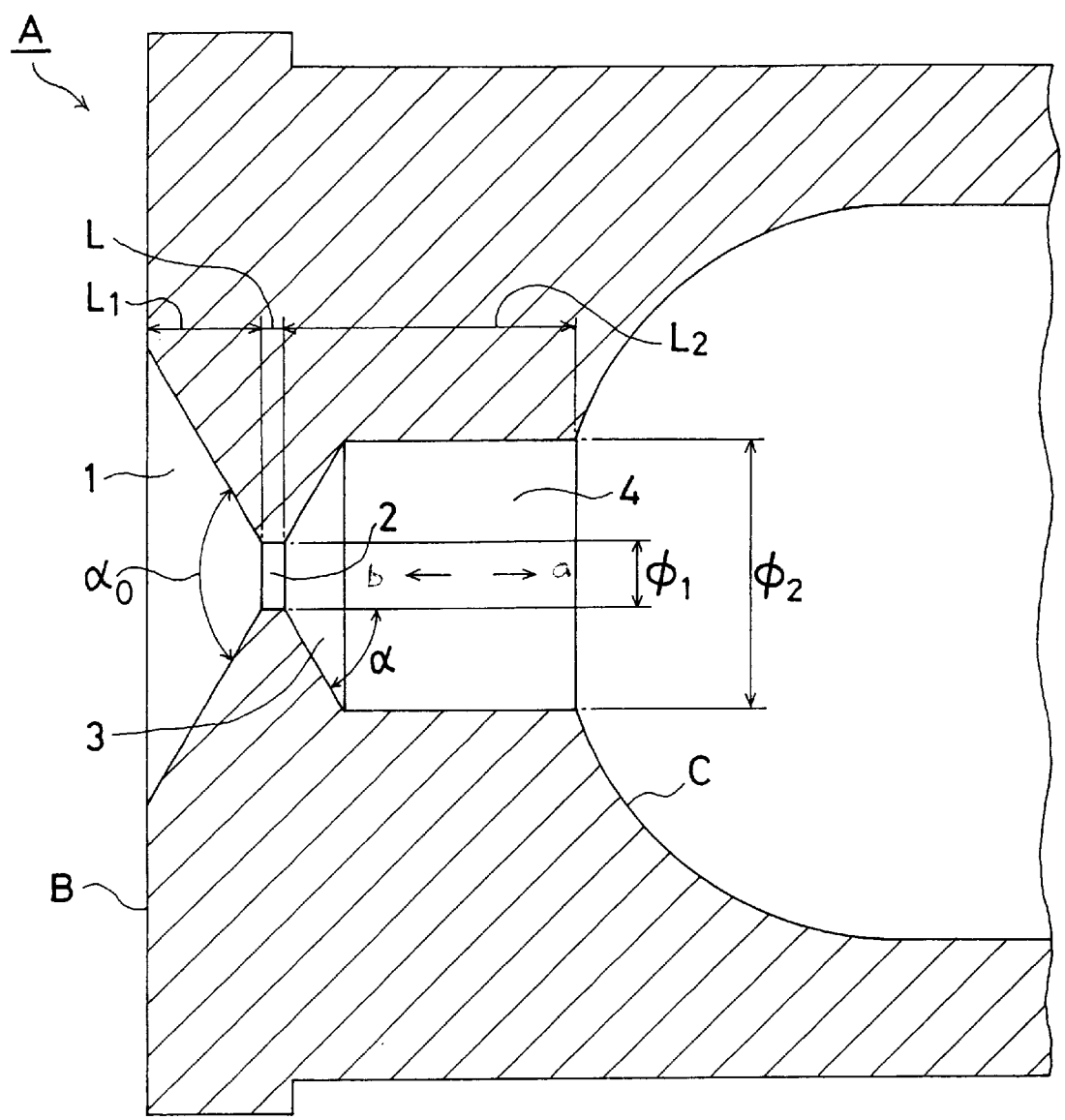
FIG. 2 is a partially vertical, sectional view of an orifice for a pressure-type flow rate controller of the second embodiment of the present invention.

FIG. 2 shows a second embodiment of the orifice A according to the present invention. In the second embodiment, the inlet taper 1 is formed with the inner wall surface being straight as seen in vertical section. That is, the inlet taper 1 is conic with an inclination angle $α_0$ of 120 degrees.

The other dimensions are the inside diameter Ø of the orifice=0.14 mm, the depth L1 of the inlet taper 1=0.25 mm, the length L of the narrowed straight section 2=0.05 mm, the inside diameter $Ø_2$ of the enlarged straight section 4=0.16 mm, the inclination angle α=60 degrees and the length L2 of the inner taper 3, and the enlarged straight section 4=0.65 mm.

It is noted that while the embodiments of the orifice in FIG. 1 and FIG. 2 are 0.11 mm and 0.14 mm in inside diameter respectively, the preferable inside diameter Ø of the orifice according to the present invention is between 0.099 mm and 0.9 mm.

Now, the method of making the orifice for pressure-type flow rate controller according to the present invention will be described in detail in which the production of the orifice A shown in FIG. 1 is taken as an example.

Figure 3:
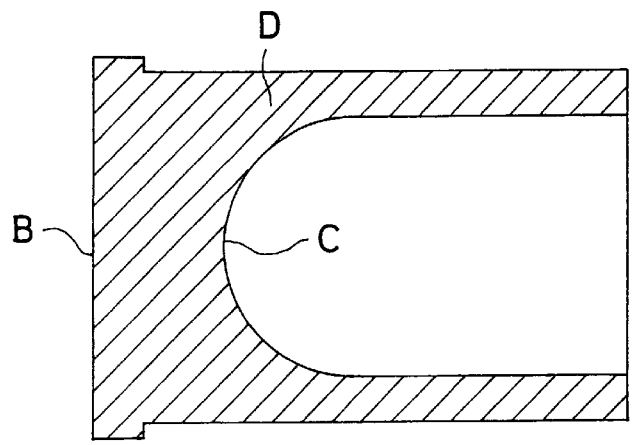
FIG. 3 is a vertical, sectional view of an orifice plate defining an orifice A.

Referring to FIGS. 3 to 9, a stainless steel plate of about 3 mm in thickness under the JIS designation SUS 316L is cut to form an orifice plate D as shown in FIG. 3.

It is noted that the orifice plate D formed is plain on the inlet side outer surface B and spherical (or concave) on the outlet side outer surface C.

Figure 4:
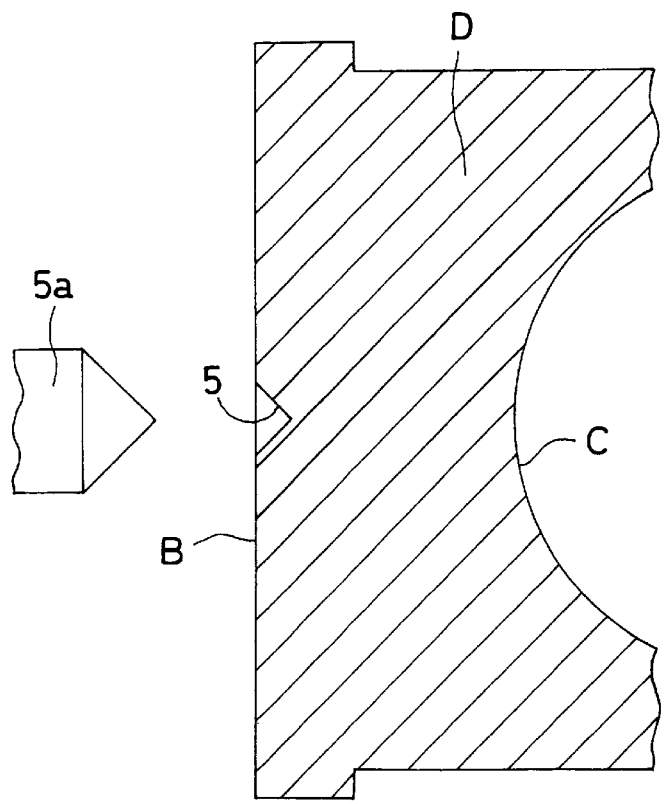
FIG. 4 is a diagrammatic illustration showing a step of machining an orifice A, that is, the center tapping step.

The orifice plate D thus formed is cut to define a depression in the center of the outer surface B on the inlet side as shown in FIG. 4. Using a vertical center tapping machine, a center depression 5 with a triangular section as indicated in FIG. 4 is made with a sharp pointed tip of a punch 5a in what is referred to as the centering step. The sharp-pointed tip of the punch 5a is made of a high-speed steel (HSS) and has a point angle of 90 degrees. The depression 5 made in this way is 0.1 mm deep.

Figure 5:
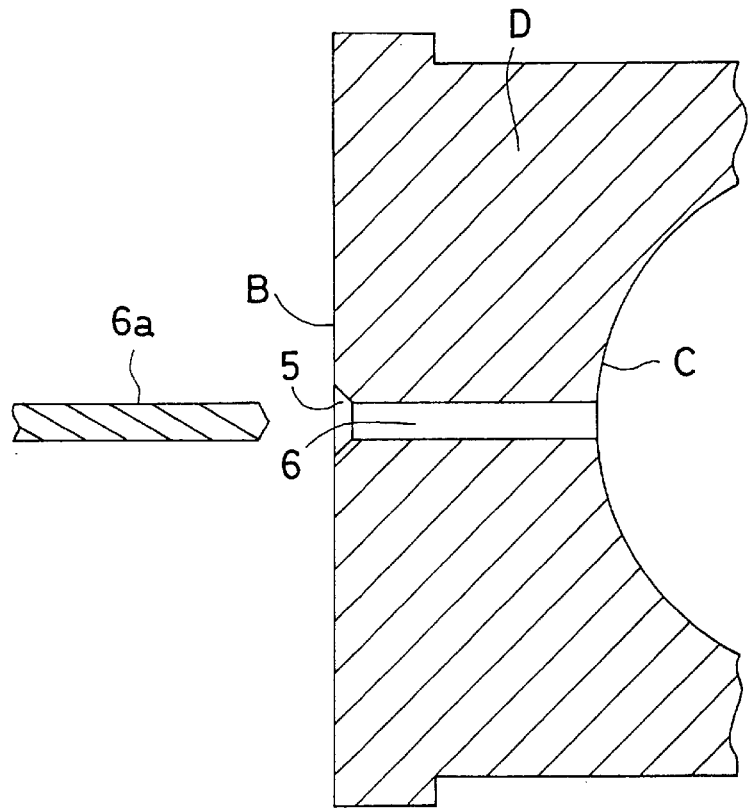
FIG. 5 is a diagrammatic illustration showing the step of forming the narrowed straight section.
Figure 6:
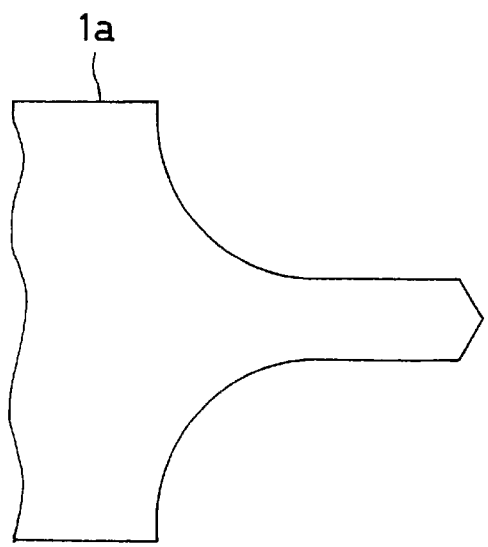
FIG. 6 is a diagrammatic illustration showing a bell-shaped cutting tool for forming an inlet taper.
Figure 7:
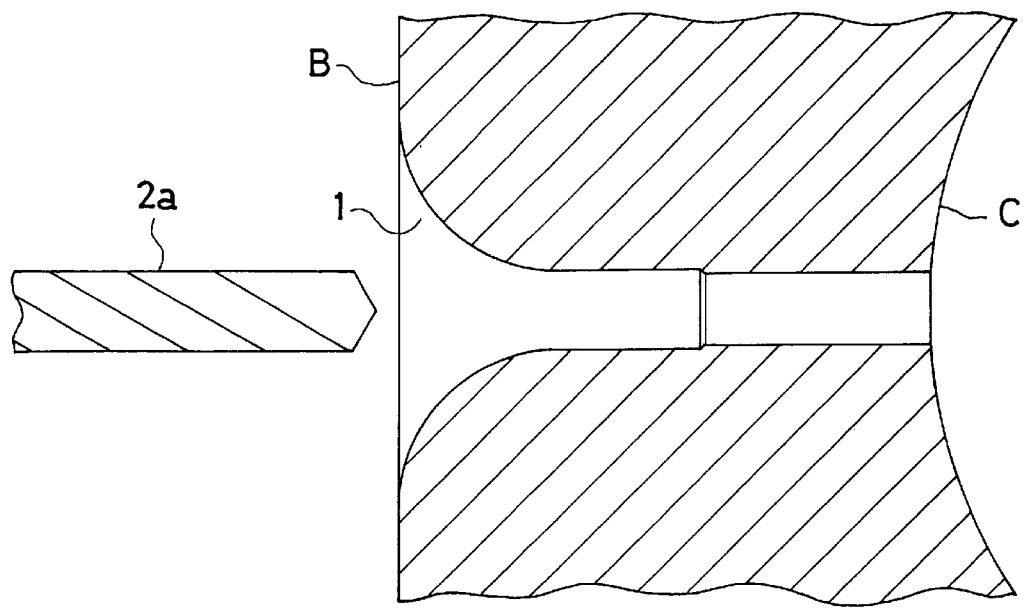
FIG. 7 is a diagrammatic illustration showing formation of the inlet taper and the narrowed straight section.

In the next step, a preliminary hole 6 is made by drilling the orifice plate from the center depression 5 inward as shown in FIG. 5 using a 0.1-mm Ø sintered carbide drill 6a. Then, using a bell-shaped cutting tool 1a with a curvature radius of 0.22 mm as shown in FIG. 6, the inlet of the preliminary hole 6 is tapered to form an inlet taper 1 with a curved inner wall surface in the shape of a flared bell as shown in FIG. 7.

In forming the orifice A shown in FIG. 2, a straight cutting tool with a point angle $α_0$ of 120 degrees (not shown) is used instead of the aforesaid bell-shaped cutting tool 1a. The inlet taper 1 formed is in the shape of a cone with the inner wall surface being straight in cross-section as shown in FIG. 2.

After forming the inlet taper 1, the bell-shaped cutting tool 1a is replaced with a drill 2a of 0.11-mm in diameter. With this drill 2a, a hole 0.11 mm Ø in diameter is drilled from the fluid inlet side (the outer surface B) toward the fluid outlet side or the outer surface C on the outlet side). Thus, the preliminary hole 6 made by the 0.1-mm Ø drill 6a is enlarged to 0.11 mm in diameter.

Figure 8:
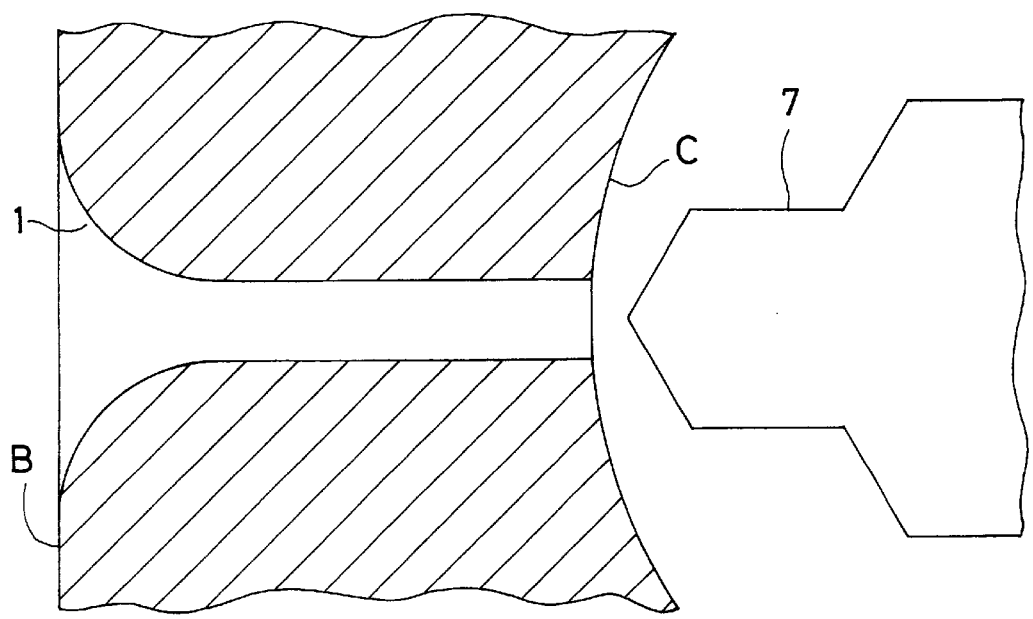
FIG. 8 is a diagrammatic illustration showing a deburring step using a center drill.

The drill 2a is then replaced with a center drill 7 with an outside diameter of 0.3 mm and a point angle of 120 degrees as shown in FIG. 8. The chuck this time faces the reverse face of the orifice plate and the drill 7 is advanced inward from the fluid outlet side of the 0.11-mm Ø hole until the drill tip is 0.05 mm deep, thus removing burrs on the outlet edge.

Figure 9:
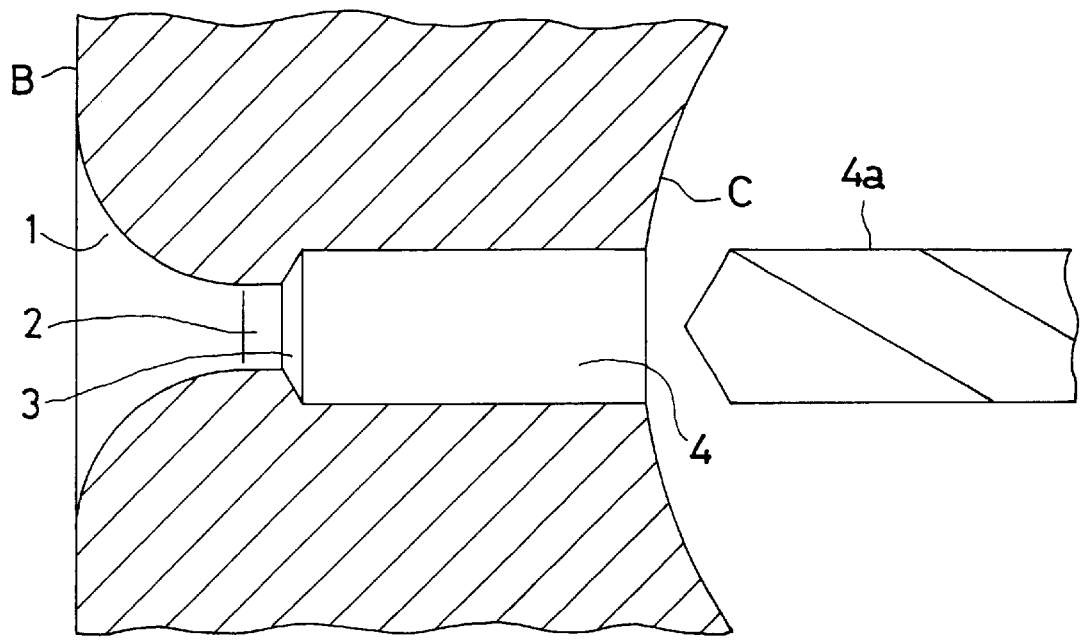
FIG. 9 is a diagrammatic illustration showing the formation of an inner taper and an enlarged straight section.

After the deburring step, the center drill 7 is replaced by an enlarging drill 4a with a diameter of 0.2 mm and a point angle of 120 degrees. With this drill, an enlarged straight section 4 with a diameter of 0.2 mm is formed, as shown in FIG. 9.

Finally, the drill 4a is replaced with the 0.11-mm Ø drill 2a again. Using this drill 2a, the burrs left between the narrowed straight section 2 and the inner taper 3 are removed.

As set forth above, the orifice according to the present invention is formed by just cutting, drilling and deburring by means of the bell-shaped cutting tool 1a, a 0.1-mm Ø drill 6a, the 0.11-mm Ø drill 2a, the 0.2-mm Ø drill 4a, and the center drill 7. It does not require any special polishing or boring by electric discharge.

That is, the orifice A according to the present invention can be manufactured by very simple steps and with low cost.

Figure 10:
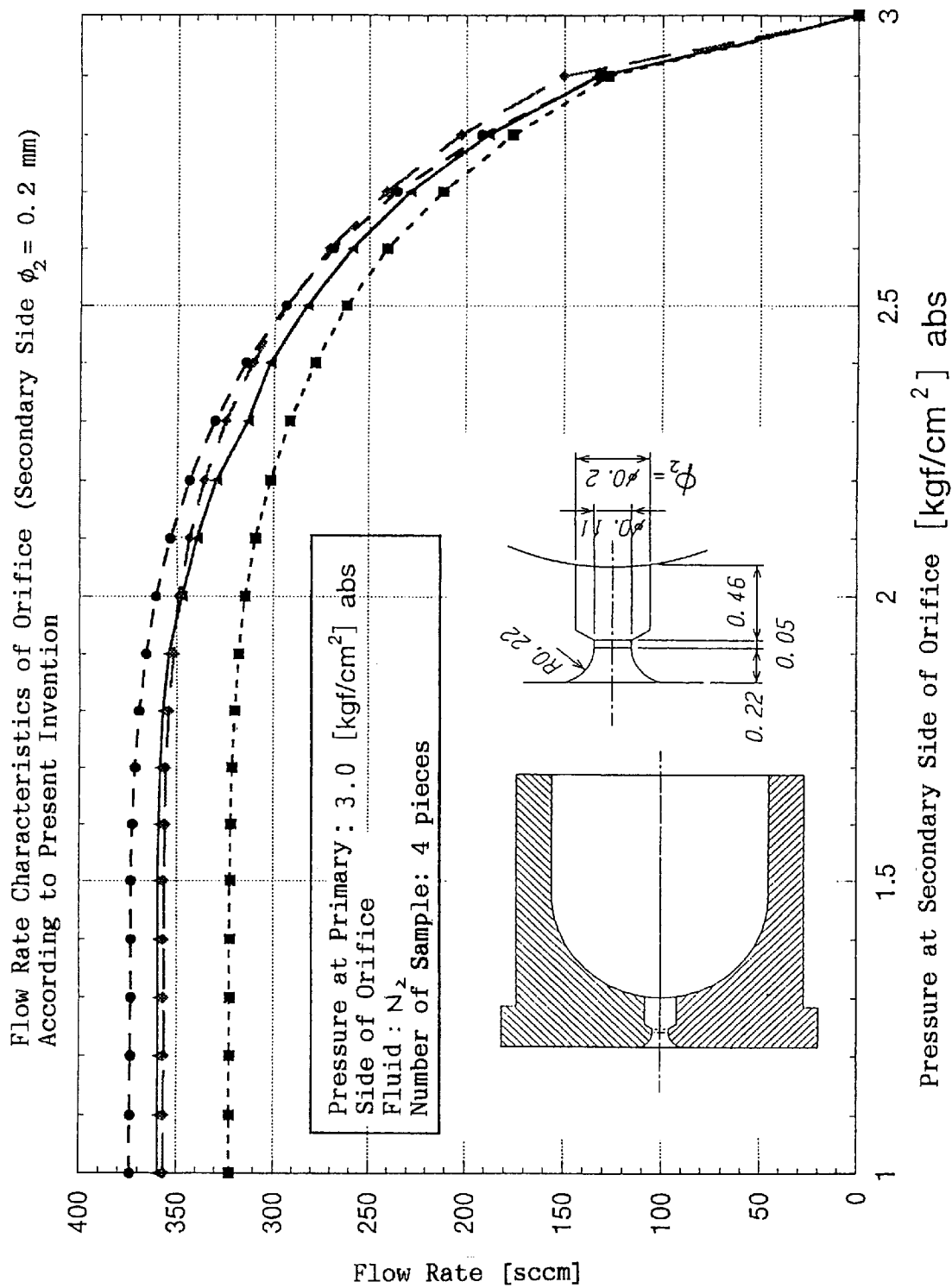
FIG. 10 depicts flow characteristics curves of an orifice A (bore diameter=0.11 mm) according to the present invention.

FIG. 10 shows the flow rate characteristics of four samples of the orifice A in Fib. 1 (inside diameter of enlarged straight section=0.2 mm) according to the present invention.

As is evident from FIG. 10, the linearity between the flow rate and the primary side pressure P1 is well maintained in a range of the ratio P2/P1 of the secondary side pressure P2 to the primary side pressure P1 up to 0.583 (where P1=3.0 kgf/cm$^2$abs, P2=1.75 kgf/cm$^2$abs).

Although formed using only the bell-shaped cutting tool 1a, drills 2a, 4a, and 6a, and deburring center drill 7, all the samples maintained the linearity in the range up to a P2/P1 ratio equal to 0.583, proving to be excellent in practical usefulness.

Figure 11:
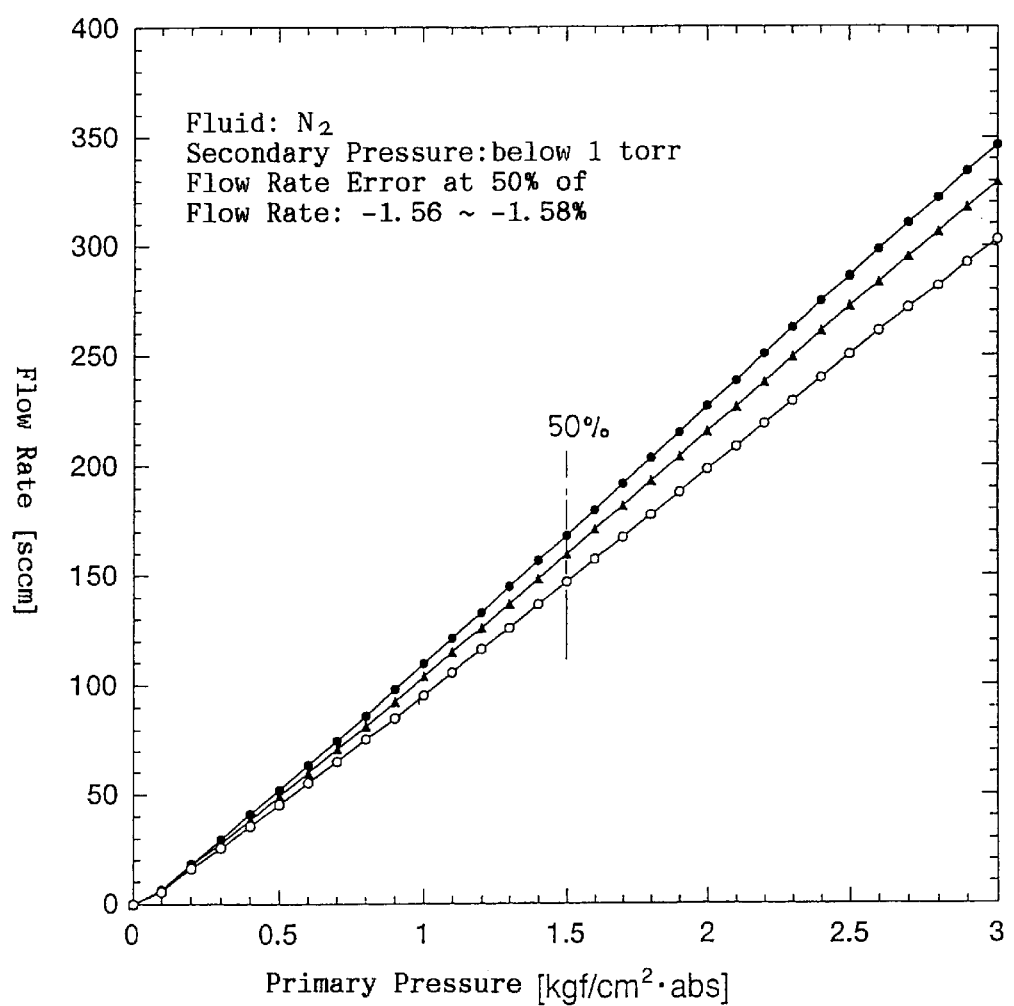
FIG. 11 is a graph showing an example of orifice flow rate-pressure characteristics according to the present invention.

FIG. 11 shows the flow rate-pressure characteristics of three samples of the above-mentioned four according to the present invention. While some differences are observed among the three samples in flow rate, a proportional relationship between the pressure and the flow rate is observed in each of the three orifice samples, exhibiting high linearity characteristics (i.e., Q=KP1).

In measurement of pressure-flow rate in FIG. 11, the flow rate error was calculated this way. The first step was to find the difference between the measured flow rate value and the set flow rate value at 50 percent of the maximum set flow rate (flow rate at a primary pressure of 3 kgf/cm$^2$abs). Then the ratio of that difference to the maximum set flow rate was calculated and indicated as flow rate error in percentage. It is shown that with the aforesaid flow rate error, ranging from −1.56% to −1.58%, the orifices according to the present invention are high enough in precision for practical use.

Figure 12:
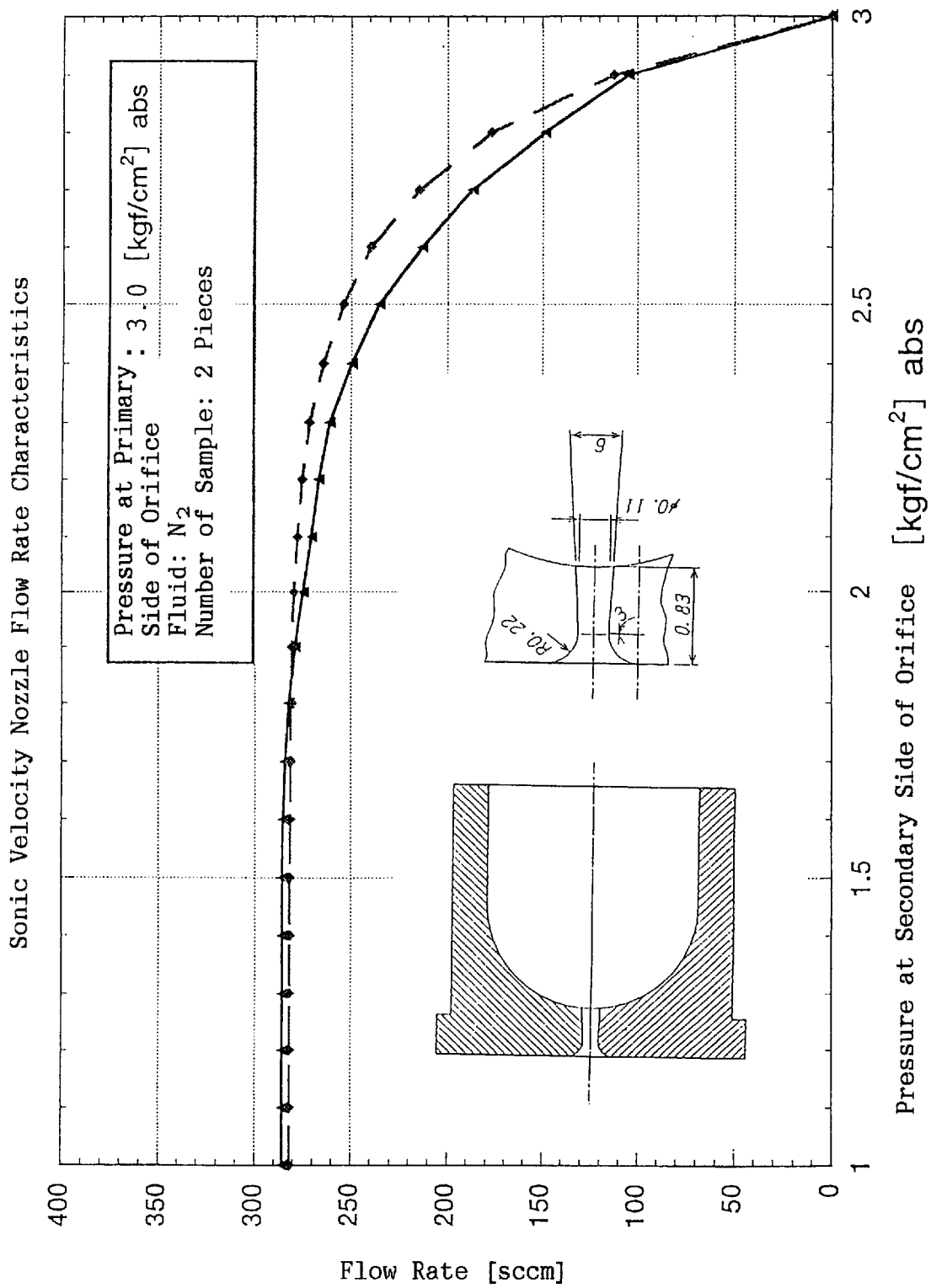
FIG. 12 depicts flow rate characteristics of sonic velocity-type orifices conforming to ISO 9300.

Meanwhile, FIG. 12 shows flow rate characteristics of two samples of the prior art sonic velocity nozzle-type orifice conforming to ISO 9300 specifications. Of the two samples, one maintains the linearity in the range up to a P2/P1 ratio of 0.633 (where P1=3.0 kgf/cm$^2$abs, P2=1.9 kgf/cm$^2$abs), but the other maintains linearity in the range only up to a P2/P1 ratio of 0.51. This indicates that there is much difference in linearity from sample to sample.

The sonic velocity nozzle-type orifice is finished in a complicated configuration after going through machining steps including polishing. While manufacturing costs are very high, that type of orifice has a fatal shortcoming from the view point of practical application, in that there is much difference in flow characteristics from product to product, that is, some are high in linearity while others are too poor in linearity.

Figure 13:
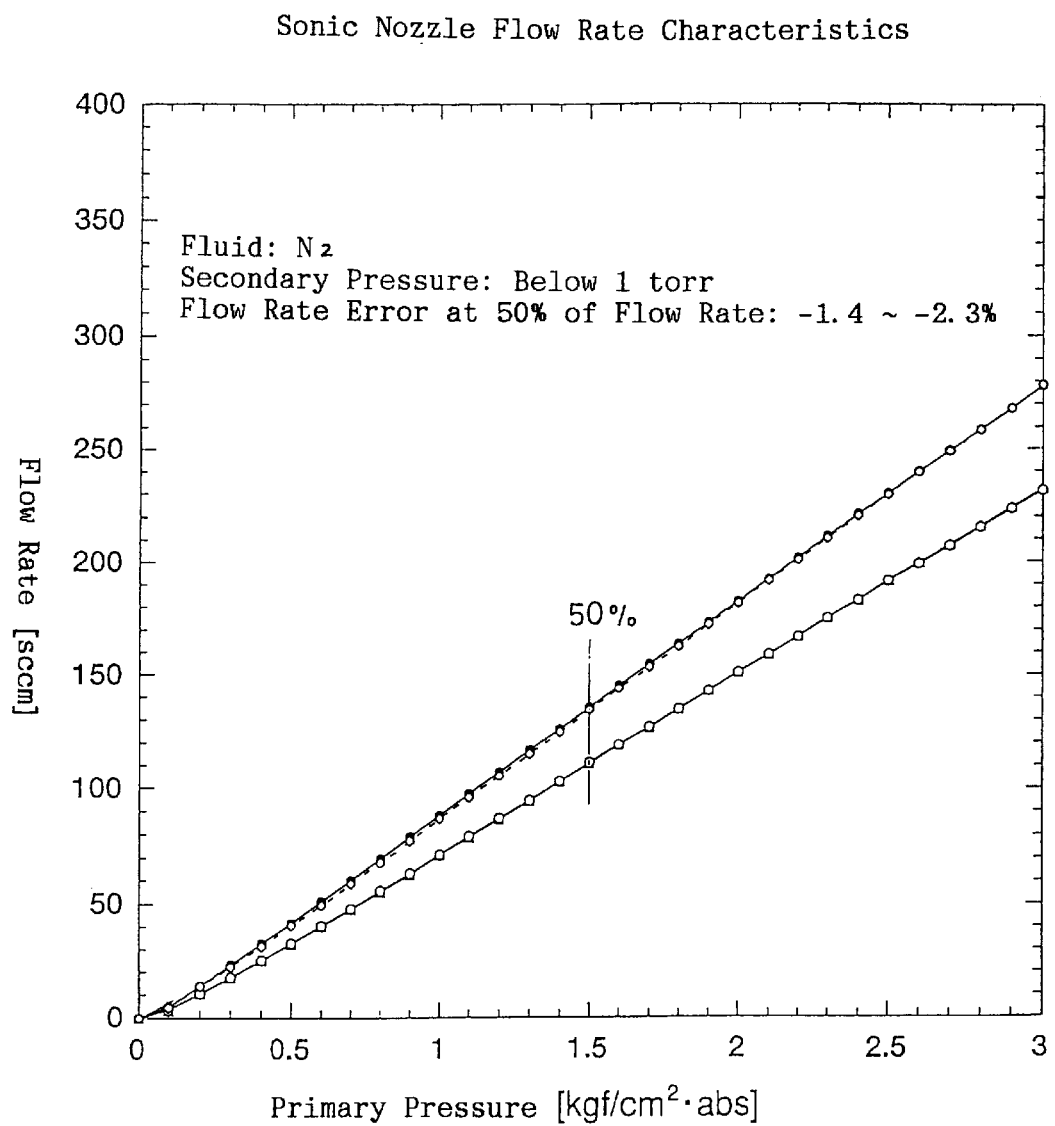
FIG. 13 depicts flow rate-pressure characteristics of the sonic velocity-type orifices shown in FIG. 12.

FIG. 13 shows the flow rate-pressure characteristics of the orifices of the sonic velocity nozzle type as shown in FIG. 12. The flow rate error was from −1.4 to −2.3% at 50 percent of the maximum set flow rate.

Figure 14:
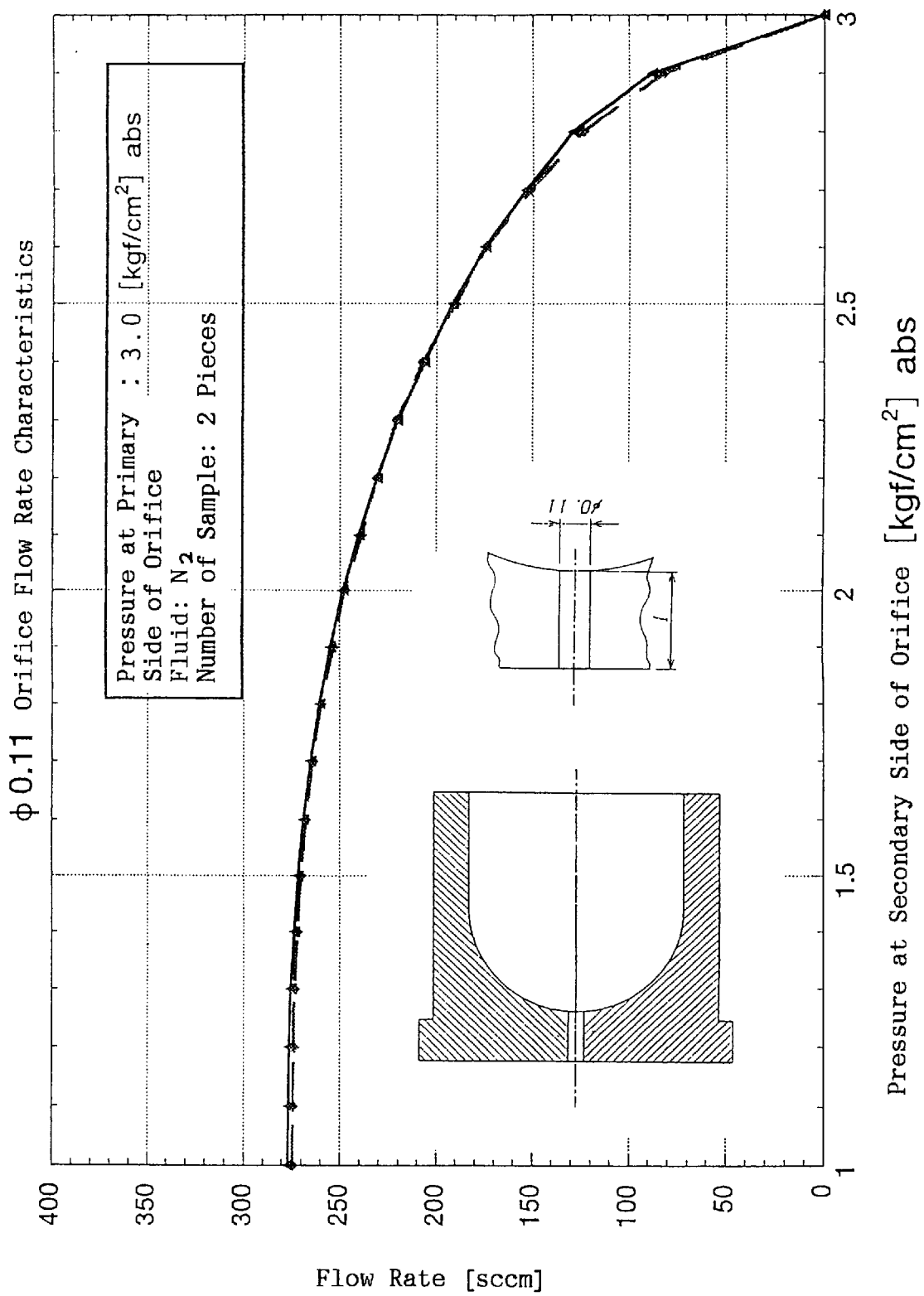
FIG. 14 depicts flow characteristics of orifices with a bore diameter of 0.11 mm machined in a simplified process.

FIG. 14 shows the flow rate characteristics of orifices made in a much simplified process, which involves merely drilling the orifice plate D with a 0.11 mm drill from the inlet side and deburring the edge of the outlet with the center drill 7.

Figure 15:
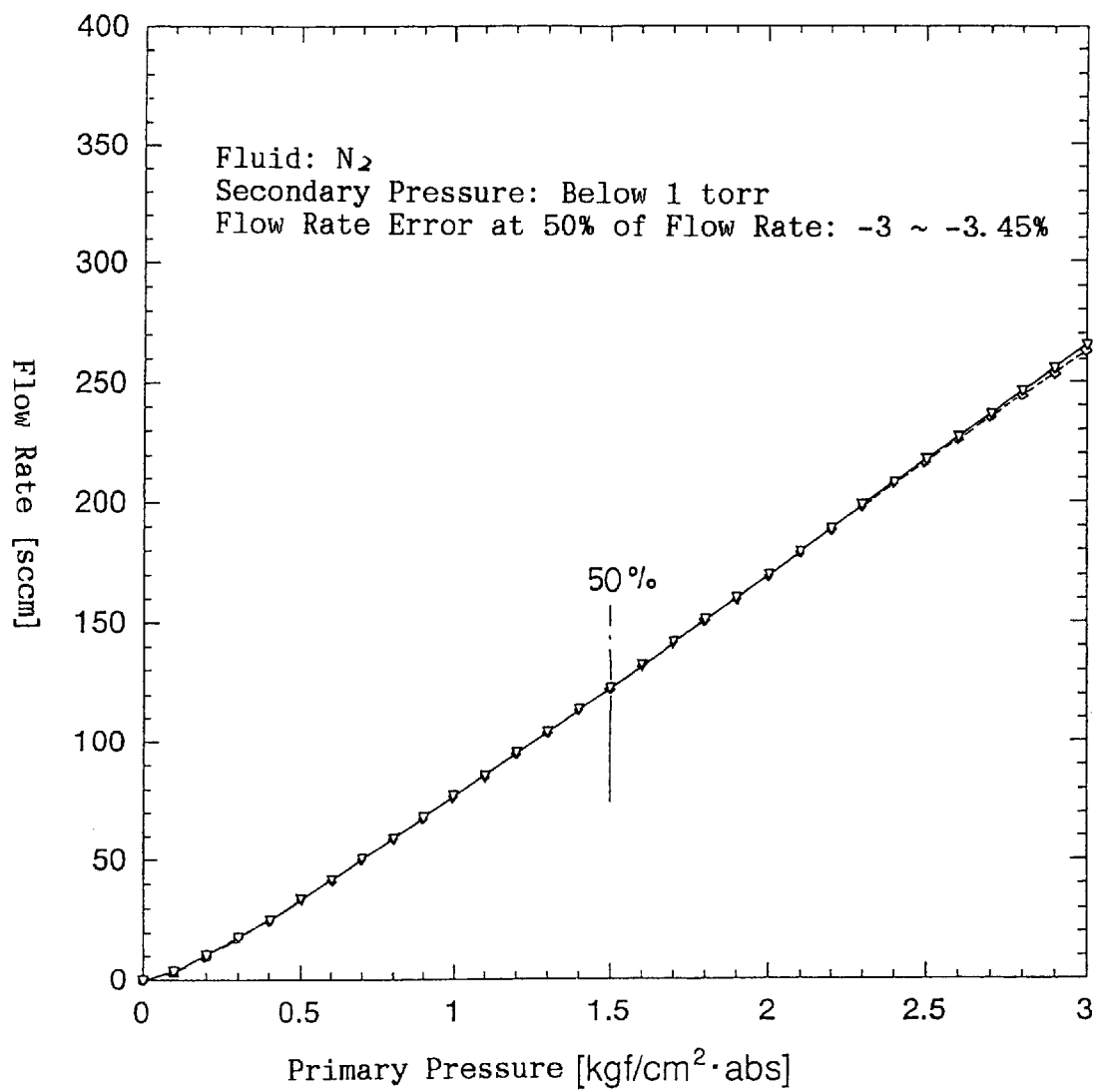
FIG. 15 depicts flow rate-pressure characteristics curves of the orifices shown in FIG. 14.

While orifices of the make shown in FIG. 14 are easy to form and highly economical, the problem is that the region where the linearity is good enough is very narrow—only the range up to a P2/P1 ratio of 0.417 (where P1=3 kgf/cm$^2$abs, P2=1.25 kgf/cm$^2$abs). FIG. 15 shows the flow rate-pressure characteristics of the orifices of the make shown in FIG. 14. The flow rate error was from −3 to −3.45% at 50 percent of the maximum set flow rate.

Figure 16:
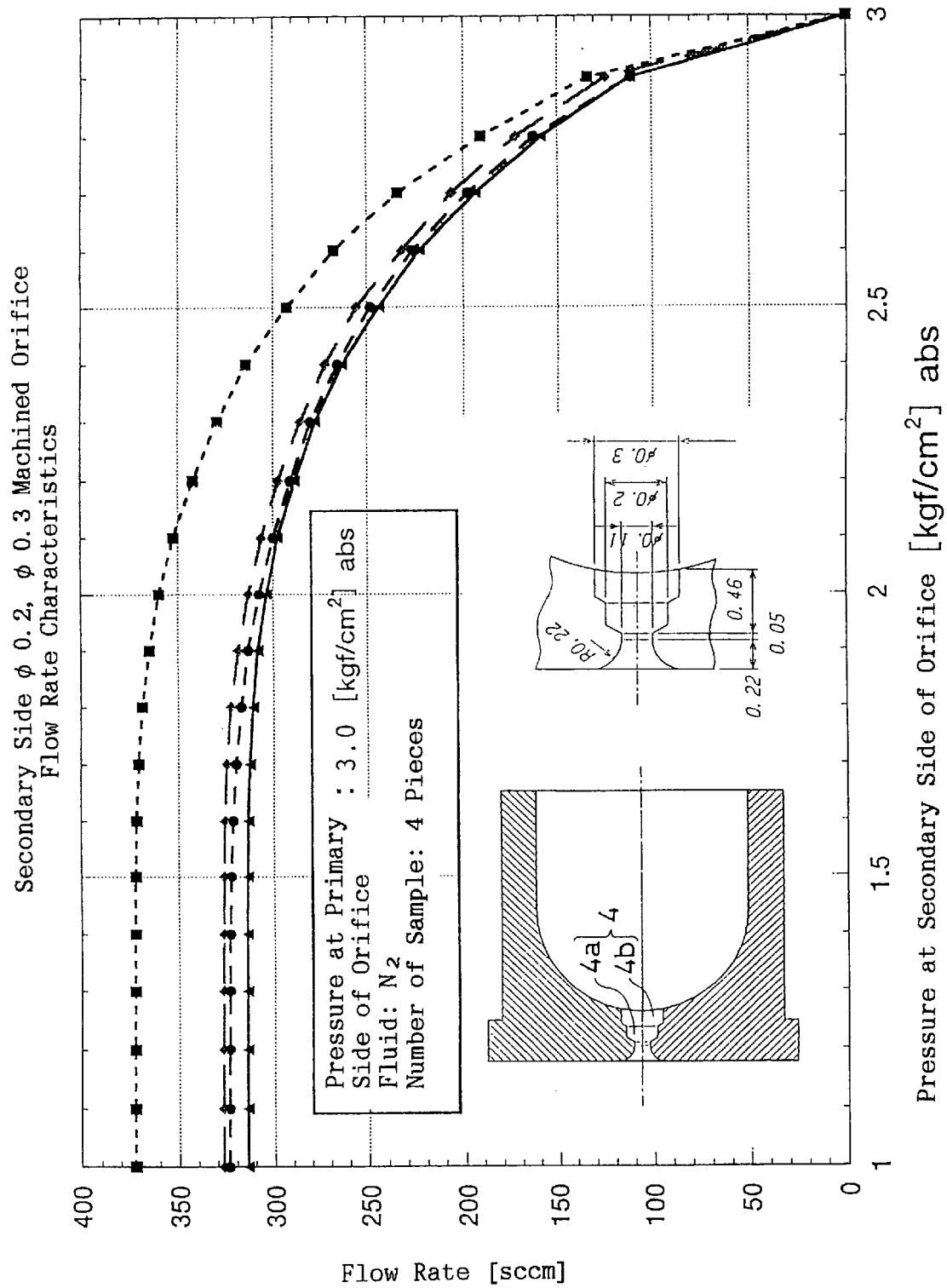
FIG. 16 depicts flow characteristics of orifices provided with a straight two-step enlarged straight section.

FIG. 16 depicts flow characteristics of orifices provided with a straight two-step enlarged section consisting of the first enlarged straight section 4a of 0.2 mm Ø in diameter and the second enlarged straight section 4b of 0.3 mm Ø in diameter.

While the orifices of the type shown in FIG. 16 require two additional steps in the manufacturing process, that is, deburring the edge of the 0.2-mm Ø hole section and drilling the 0.3-mm Ø hole section, the linearity is limited to the range up to a P2/P1 ratio of 0.567 (where P1=3 kgf/cm$^2$abs, P2=1.7 kgf/cm$^2$abs) with the linearity range narrower than that of the orifice A of the present invention.

Figure 17:
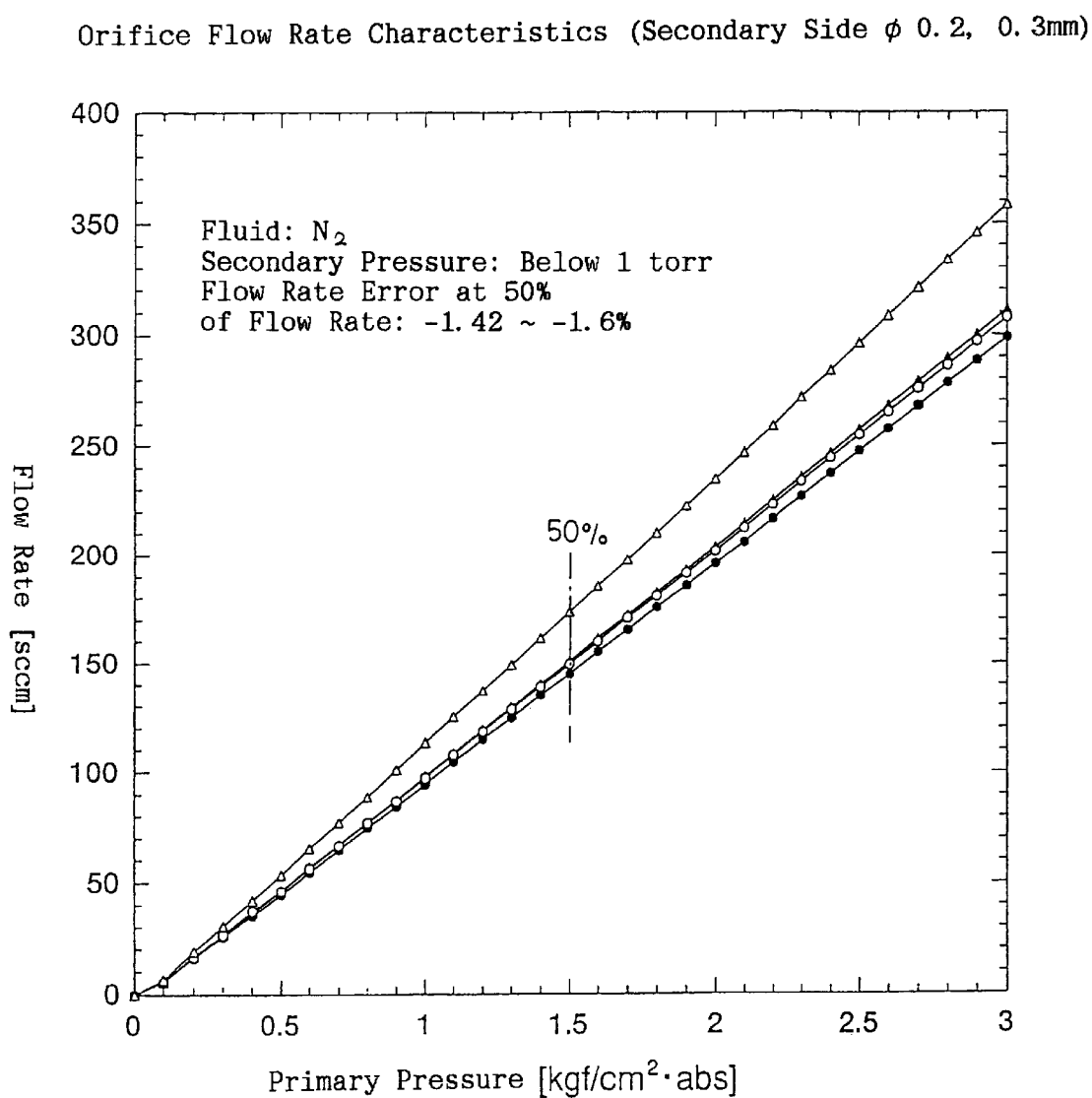
FIG. 17 depicts flow rate-pressure characteristics of the orifices shown in FIG. 16.

FIG. 17 shows the flow rate-pressure characteristics of the orifices of the make shown in FIG. 16. The flow rate error was from −1.42 to −1.6% at 50 percent of the maximum set flow rate.

Figure 18:
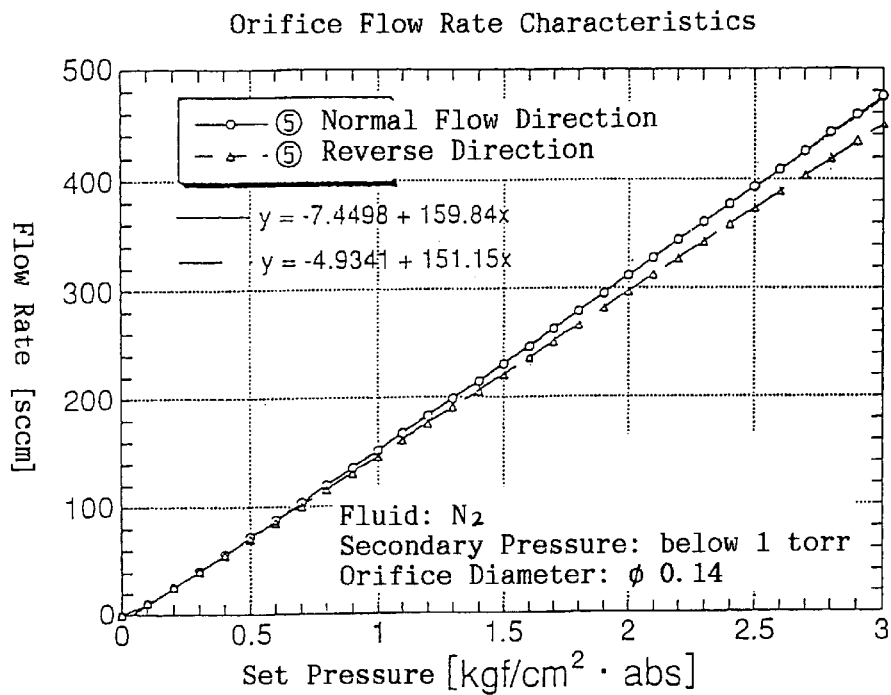
FIG. 18 depicts flow rate-pressure characteristics of orifices provided with a cone-shaped inlet taper.
Figure 19:
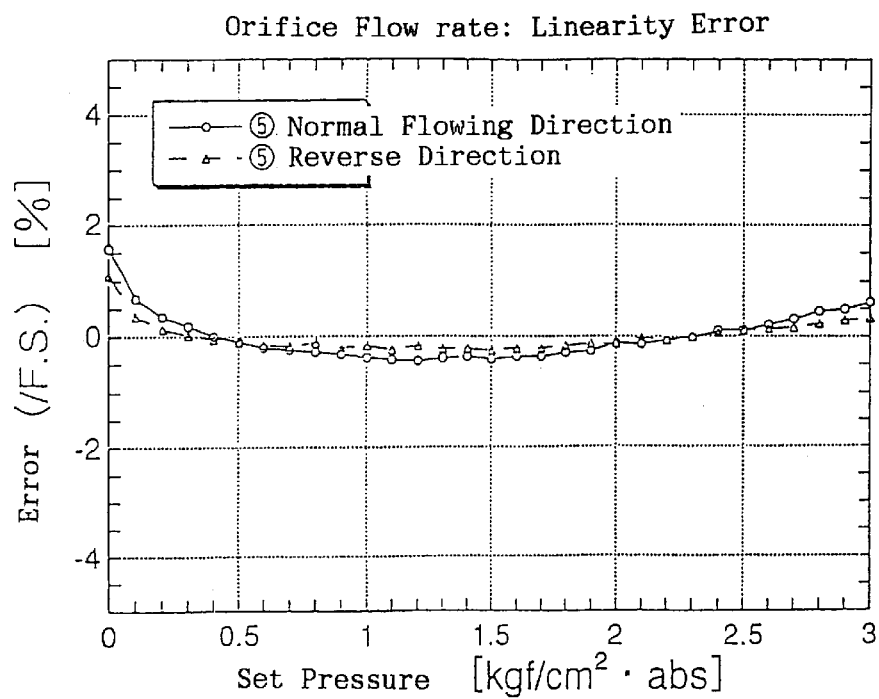
FIG. 19 depicts flow rate-linearity error curves of orifices A provided with a cone-shaped inlet taper.
Figure 20:
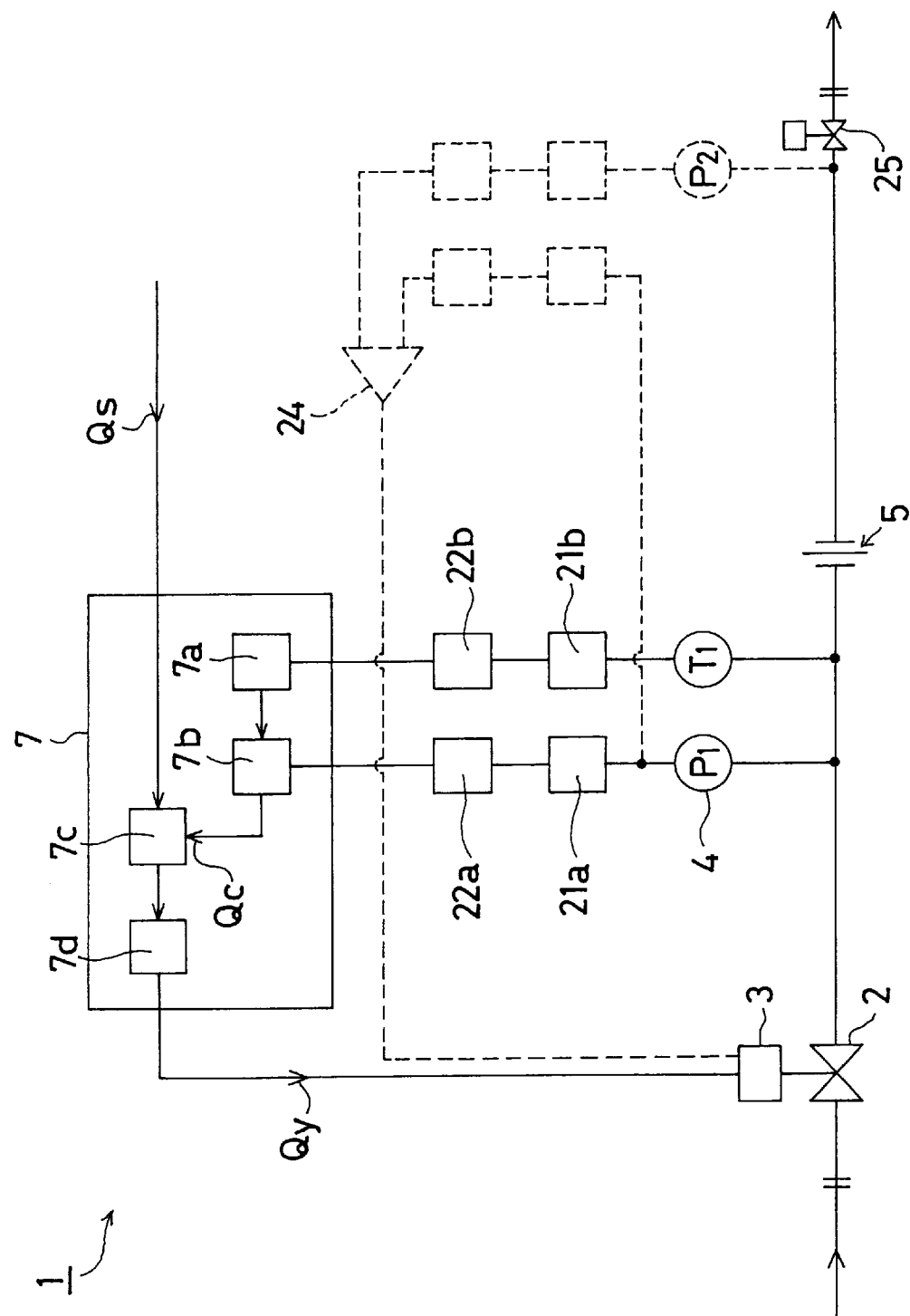
FIG. 20 is a schematic diagram showing a prior art pressure-type flow rate controller.

FIG. 18 shows the flow rate characteristics of the orifices A according to the second embodiment of the present invention illustrated in FIG. 2. FIG. 19 depicts linearity error curves of the flow rate of the orifices A shown in FIG. 2.

The linearity errors (IF-S%) were worked out this way: On the basis of the curve of the flow rates measured in a set pressure range between 0 and 3.5 (kgf/cm$^2$abs), an approximate line in which the maximum plus difference and the maximum minus difference were the least and equal was found against the aforesaid curve of the measured flow rates by the least squares method. The difference between the approximate line value and the measured value was indicated in percentage as against the maximum flow rate value. The orifices A have a linearity error of +1.10% at maximum with the flow of fluid in the normal flowing direction (in the direction of arrow a in FIG. 2) and a linearity error of 0.243% at maximum with the flow of the reverse direction (in the direction of arrow b in FIG. 2). As shown, the linearity error with the flow of fluid in the reverse direction is markedly small.

Unlike the orifices shown in FIGS. 12, 13, and 16, the orifice A of the present invention can be formed in a very small number of production steps. Furthermore, the steps involve chiefly cutting and drilling and do not require specialized skills such as surface polishing.

Therefore, that the cost of manufacturing are lowered substantially as compared with the other types of orifices.

That is also true with respect to the orifice A of the second embodiment of the present invention in FIG. 2. That is, the orifice A of the second embodiment, too, can be manufactured at a low cost.

With the orifice A of the present invention, the linearity between the flow rate and the primary side pressure P1 is maintained in the range up to a P2/P1 ratio of 0.583. In addition, there arises little non-uniformity in flow characteristics curves from orifice to orifice. That is, almost all the orifices which are produced according to the present invention maintain the linearity in the range up to a P2/P1 ratio of 0.583.

As a result, with the orifice of the present invention, therefore, the flow rate Q can be corrected by merely adjusting the constant K in the equation Q=KP1. That quite simplifies the adjustment of the flow rate characteristics of the orifice A. Furthermore, the orifice A of the present invention is excellent in flow rate-pressure characteristics, that is, linearity. The flow rate error at 50 percent of the maximum flow rate is also relatively low at from −1.56 to −1.56%, which is low enough for practical application of the orifice.

Besides, the orifice A of the second embodiment of the present invention in which the inlet taper is cone-shaped exhibits a high linearity with less linearity error of the flow rate, which permits control of the flow rate with high precision.

As set forth above, the orifices for pressure-type flow rate controllers as disclosed herein can be manufactured by simple methods at low cost in accordance with the present invention. In addition, the orifices maintain the linearity between the primary side pressure P1 and the flow rate in a relatively wide range of the pressure ratio P2/P1 and permit adjusting the flow characteristics (flow correction) with ease, thus providing excellent practical results.

What is claimed is:

1. An orifice for a pressure-type flow rate controller wherein the fluid flow rate Q on a downstream side of the orifice is calculated according to the equation Q=KP1 where K=a constant and P1=a pressure on an upstream side of the orifice with the ratio P2/P1 of pressure P2 on the downstream side of the orifice to the pressure P1 on said upstream side kept below a critical pressure ratio and wherein a means determines the difference between the calculated flow rate Q and a set flow rate Qs and actuates a control valve on the upstream side of said orifice so as to regulate the upstream pressure P1 for bringing the downstream flow rate to said set flow rate, said orifice comprising:

a stainless steel plate about 2 to 3 mm in thickness said plate having an inlet taper on an inlet side thereof in the shape of a bugle and a short narrowed straight section adjoining the inlet taper formed by cutting an upstream opening end of a preliminary hole made in said plate;

a short inner taper adjoining said narrowed straight section and an enlarged straight section adjoining the short inner taper formed by enlarging a second opening end of the preliminary hole; and, said plate having, on an outlet side thereof, an outlet hole extending toward said enlarged straight section, said outlet hole having a wall which converges toward said enlarged straight section.

2. An orifice for a pressure-type flow rate controller as defined in claim 1, wherein said inlet taper is formed to have an inside wall surface curved as seen in a sectional view.

3. An orifice for a pressure-type flow rate controller as defined in claim 1, wherein said inlet taper is formed with an inside wall surface that is straight as seen in a sectional view.

4. A sonic velocity orifice comprising a thin metal plate and an unobstructed path for fluid flow extending through said plate from an upstream side to a downstream side thereof, said unobstructed path comprising an inlet portion with a sloping wall joining a short circular portion, an inner taper diverging from said short circular portion toward said downstream side and joining a circular straight portion of greater diameter than said short circular portion, and an outlet portion terminating at said downstream side, said outlet portion having a converging wall which joins said circular straight portion.

* * * * *